US 3,519,624
Patented July 7, 1970

3,519,624
ANTIMICROBIAL PREPARATIONS CONTAINING N-ACYL-3,4-DIHYDRO-OXAZINES-(1,3)
Helmut Huber-Emden, Basel, Paul Schaefer, Riehen, Arthur Maeder, Therwil, and Hans-Rudolf Hitz, Muttenz, Switzerland, assignors to Ciba Limited, Basel, Switzerland, a company of Switzerland
No Drawing. Filed July 6, 1967, Ser. No. 651,397
Claims priority, application Switzerland, July 20, 1966, 10,525/66
Int. Cl. C07d 87/14
U.S. Cl. 260—244                                           6 Claims

ABSTRACT OF THE DISCLOSURE

The present invention provides novel N-acyl-3,4-dihydro-oxazines-(1,3). These new compounds are suitable as active ingredients in antimicrobial preparations. Some of the new compounds may be polymerized and both the monomeric compounds and the polymers made from them possess antimicrobial, especially fungicidal and/or bactericidal and bacteriostatic properties. The new compounds correspond to the formula

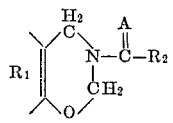

where A represents a sulphur or an oxygen atom, $R_1$ a radical containing a single carbocyclyl-aromatic six-membered ring which is condensed with the dihydrooxazine ring in the manner indicated by the valency lines, and further substituent, and $R_2$ represents an aliphatic or a monocyclic benzene radical $R_1$ contains at least one aromatic radical bound through a carbon atom with the group

---

The present invention provides antimicrobial preparations containing as active ingredient at least on N-acyl-3,4-dihydro-oxazine-(1,3) of the formula (I)

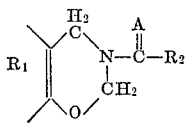

in which A represents a sulphur atom or preferably an oxygen atom, $R_1$ a residue containing a single carbocyclyl-aromatic single-membered ring which is condensed with the dihydro-oxazine ring in the manner indicated by the valency lines, and a monocyclic benzene residue $R_1$ contains in addition at least one more substituent, and $R_2$ represents an aliphatic or aromatic residue bound by a carbon atom with the group

The residues $R_1$ are above all substituted benzene residues, though heterocyclic residues are likewise suitable, for example quinolines of the formula (II)

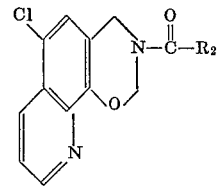

where $R_2$ has the meaning defined above.

Among the N-acyl-3,4-dihydro-oxazines of the Formula I compounds of the formula (III)

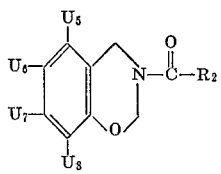

are preferred. In the Formula III at least one U, preferably $U_6$, stands for a halogen atom, or for a possibly further substituted alkyl radical, a nitro group or a possibly further substituted benzene residue bound with the fused-on benzene residue directly or through an azo bridge, and the other U's represent hydrogen atoms or one of the substituents indicated above, and $R_2$ is an aliphatic or aromatic residue bound through a carbon atom with the group

Particularly valuable are compounds of the formula (IV)

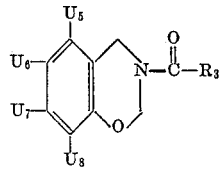

in which $U_5$ to $U_8$ have the above meanings and $R_3$ represents a substituted methyl group, such as a morpholinomethyl group, a cyanomethyl group, a thiocyanomethyl group, an ethylmethylthioether residue, or more especially a halogenomethyl group, such as a fluoro-, chloro-, bromo- or iodo-methyl group, a possibly further substituted benzene residue or an alkene group. Included therein are also the group of compounds in which at least one U represents a member selected from the group consisting of halogen, lower alkyl of 1–4 carbon atoms, trifluoromethyl, nitro, phenyl, p-chlorophenyl, phenyldiazo and p-chlorophenyldiazo, and the other U's represent each a member selected from the group consisting of hydrogen and one of the substituents mentioned above, and $R_3$ represents a member selected from the group consisting of morpholinomethyl, cyanomethyl, thiocyanocethyl, ethylmercaptomethyl, halogenomethyl, vinyl, α-halogenvinyl, phenyl, p-chlorophenyl and p-nitrophenyl. Preferred use is made, however, of oxazines of the formula (V) 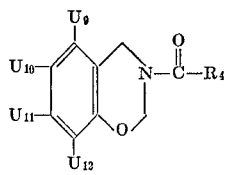

in which at least one U is a tertiary butyl group, an isopropyl group, a trifluoromethyl group, a para-chlorophenyl group, a para-chlorophenyldiazo group or a hydroxyl group, more especially a fluorine, chlorine or bromine atom, a methyl group or a nitro group. From among these substituents the chlorine atom is preferred. $R_4$ represents a halomethyl group, a vinyl or α-halovinyl group. Among these substituents represented by $R_4$ the chloromethyl group is preferred.

The N-acyl-3,4-dihydro-oxazines-(1,3) of the Formula I are advantageously obtained when compounds of the formula (VI) 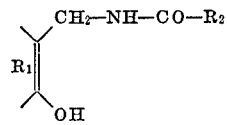

where $R_1$ and $R_2$ have the above meanings—are reacted in an anhydrous medium containing inert organic solvents or concentrated sulphuric acid, with formaldehyde or a formaldehyde donor in the presence of an acid catalyst and, if desired, further reactions are carried out in the acyl residue.

Preferred starting materials are ortho-acylaminomethylphenols of the formula (VII) 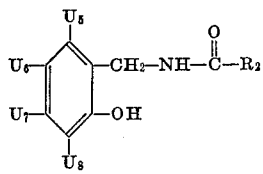

where $U_5$ to $U_8$ and $R_2$ have the above meanings.

The ring closure is preferably carried out with gaseous formaldehyde or especially with paraformaldehyde. A particularly suitable acid catalyst is para-toluenesulphonic acid, and preferred inert solvents are benzene, toluene, xylene, chlorobenzene or mixtures of benzene and dioxane. The reaction mixture is heated, the water of reaction distilled off as an azeotrope, and the reaction product is isolated and, if necessary, purified by recrystallization.

The resulting new N-acyl-3,4-dihydro-oxazines-(1,3) of the Formula I may be used, for example, for the following further reactions without destroying the oxazine system:

When $R_2$ is —CH$_2$—S—C$_2$H$_5$, the thioether group can be easily oxidized to the sulphoxide group.

When $R_2$ is —CH$_2$Cl, it is easy to form with pyridine quaternary pyridinium salts in which $R_2$ corresponds to the formula (VIII) 

With phosphorus pentasulphide and suitable N-acyl-dihydro-oxazines there are obtained the corresponding N-thioacyl-dihydro-oxazines, for example

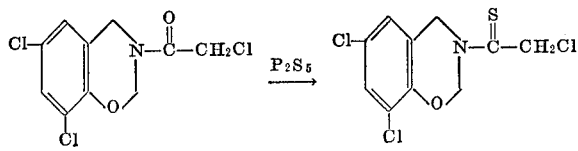

When $R_2$ is —CH=CH$_2$, it is easy to add bromine on to the acryl double bond. From the resulting N-(α,β-dibromo-propionyl)-dihydro-oxazines - (1,3) hydrogen bromide can be eliminated to form the corresponding α-bromo-acryloyl derivatives. The N-acryloyl-dihydro-oxazines-(1,3) can be polymerized by usual methods in solution or emulsion.

The starting products of the Formula VI or VII respectively required for the manufacture of the N-acyl-dihydro-oxazines-(1,3) are accessible in known manner by the so-called "Tacherniak Condensation" of, for example, suitable phenols with N-hydroxymethyl-carbonamides:

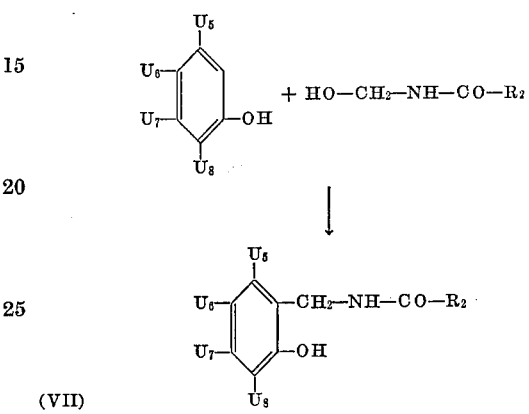

(VII)

where $R_2$ and $U_5$ to $U_8$ have the meanings defined above.

These starting materials of the Formula VI may likewise be subjected to further reactions to modify substituents, similarly to the N-acyl-3,4-dihydro-oxazines-(1,3). Thus, for example, when $R_2$ stands for a halomethyl group, can be polymerized, for example homopolymerized halogen atoms, for a secondary amine residue, for an alkylmercaptan residue or for a cyanogen group by reaction, for example, with a sodium halide, with morpholine, ethylmercaptan or potassium cyanide. Unsaturated $R_2$ residues likewise add on bromine.

As mentioned above, N-acyl-3,4-dihydro-oxazines-(1,3) of the Formula I, in which A and $R_1$ have the above meanings and $R_2$ represents an alkene or α-halogenalkene group, can be polymerized, for example homopolymerized or copolymerized with other copolymerizable, ethylenically unsaturated compounds. The new polymerization products can be manufactured in solution, emulsion or if desired in the absence of a solvent (block polymerization) in the presence of catalysts that furnish free radicals or have an ionic activity.

The copolymerizable N-acyl-3,4-dihydro-oxazines-(1,3) are suitable for copolymerization with the following monomers: Vinyl esters of organic acids, vinylalkylketones, vinylhalides, vinylaryl compounds, vinylpyrrolidone, 4-vinylpyridine, vinylcarbazole, acrylonitrile; amides of polymerizable, ethylenically unsaturated acids; amides further substituted on the nitrogen atom and their ethers such as methylacrylamide-N-methylomethyl ether; basic amides such as methacrylic acid dimethylamino-methylamide and their quaternation products; esters of polymerizable, ethylenically unsatuaretd acids and of monoalcohols and dialcohols with 1 to 18 carbon atoms or of hydroxybenzenes; furthermore also free, ethylenically unsaturated acids and polymerizable olefins.

As a rule, the polymers consist of 0.1 to 100% of an N-acryl-3,4-dihydroxy-oxazine-(1,3) or of several such oxazines and 99.9 to 0% of another polymerizable compound; depending on the polymerization conditions chosen the polymers are obtained as solutions, as gels, as emulsions or as granulates. In general, complete homopolymerization or copolymerization is not difficult to achieve, and may follow the usual practice.

Both the monomeric compounds of the Formula I and polymers made from them possess antimicrobial, especially fungicidal and/or bactericidal and bacteriostatic properties and are, therefore, used as fungicides, bactericides and bacteriostatics. The copolymers act in the first place as fungicides. When the new monomers are polymerized together with monomers imparting solubility in water and monomers that contain additional reactive groups, there are obtained polymers with fungicidal properties which can be crosslinked and are soluble in or dispersible with water and are suitable for rendering, for example textile materials, fungicidal.

The antimicrobial preparations containing compounds of the Formula I can otherwise be prepared and used in the conventional manner. A particularly valuable feature of the new preparations is their broad antimicrobial activity spectrum covering both Gram-positive and Gram-negative bacteria and fungi. Insofar as their application is concerned it is of special value that the compounds of the Formula I are odourless and colourless. Thus, the present invention includes also their use in combating microorganisms quite generally. They may be used on a very broad basis, more especially for protecting organic substrates from infestation by destructive and pathogenic bacteria and fungi. The compounds of the Formula I are therefore suitable for use as preservatives and as disinfectants for textiles and technical products of all descriptions, in veterinary medicine and in cosmetics.

From among technical products that can be preserved with the compounds of the Formula I there may be mentioned the following examples: Textile assistants and improving agents, glues, binders, paints, colour and printing pastes and similar preparations based on organic or inorganic dyestuffs or pigments, including those which contain a proportion of casein or other organic compounds. Also wall and ceiling paints, for example those which contain an albuminous colour binder, are protected by addition of the new compounds from infestation by bacteria.

Furthermore, compounde of the Formula I may be used in providing fibres and textiles with a preserving and disinfectant finish; they may be applied to both natural and synthetic fibres, where they display a durable activity against harmful (including pathogenic) bacteria and fungi. This addition may be made before, during or after a treatment of these textiles with other substances, for example colour or printing pastes, dressings or the like.

Textile materials treated in this manner are also protected from the appearance of perspiration odour as caused by bacteria.

The compounds of the Formula I may be used as preservatives also in the cellulose and paper industries, inter alia for preventing the known sludging in the paper making machines caused by bacteria.

Furthermore, when compounds of the Formula I are combined with wash active or surface active substances, there are obtained washing and cleaning agents having an excellent antimicrobial activity. These compounds may, for example, be worked into soaps, or combined with soap-free, wash-active or surface-active substances or with mixtures of soaps and soap-free wash-active substances, and these combinations retain their full antimicrobial activity.

Cleaning agents containing compounds of the Formula I may be used in industry and in the household, also in the food industry, for example in dairies, breweries or abattoirs. The compounds of the Formula I are also suitable for use as ingredients of preparations used for cleaning and disinfecting in hospitals and in medical practice.

The effect may also be utilized in preserving and disinfectant finishes of synthetics. When placticizers are used it is advantageous to add compounds in the Formula I in the form of solutions or dispersions in the plasticizer to the synthetic material. It is advantageous to ensure that the additives is distributed in the synthetic as evenly as possible. The synthetics having antimicrobial properties may be used for utilitarian objects of all kinds for which an antimicrobial effect is desirable, for example in doormats, bathroom curtains, seats, treads on steps in swimming baths and wall coverings. On incorporation in floor waxes and polishes there are obtained products for the treatment of floors and furniture having a disinfectant effect.

The compounds of the Formula I may be applied to the textile materials to be protected in a variety of ways, for example by impregnating or spraying them with solutions or suspensions containing the said compounds as active ingredients. Depending on the purpose in hand, the content of active ingredient may vary from 1 to 30 g. of active substance per litre of treatment liquor. In most cases textile materials of synthetic or natural origin are sufficiently protected from infestation by microbes by a content from 0.1 to 3% of active substance. The active ingredient may be used in conjunction with other textile assistants, such as dressing agents, anti-crease finishes or the like.

The forms of application may correspond to the conventional formulations for pesticidal control agents, for example preparations containing compounds of the Formula I may also contain other additives such as vehicles, solvents, diluents, dispersants, wetting agents, adhesives or the like and also other pesticides.

Unless otherwise indicated, parts and percentages in the following manufacturing instructions and in the examples are by weight.

MANUFACTURING INSTRUCTIONS FOR THE COMPOUNDS OF FORMULA VII REQUIRED AS STARTING MATERIALS (A) 136 grams of N-hydroxymethyl-chloracetamide are dissolved in 1.5 litres of absolute ethanol and 122 g. of 2,4-dimethylphenol and then 70 ml. of hydrochloric acid of 37% strength are added, whereupon the mixture heats up slightly. It is then kept in a stoppered flask for 12 hours, and the solvent is expelled under vacuum on a warm water bath. The residue is at first oily but crystalizes spontaneously on cooling; it is recrystallized (if necessary repeatedly) from 1.5 litres of a 1:1-mixture of alcohol and water, to yield 96.6 g. (=42.5% of theory) of the product of the formula (A) 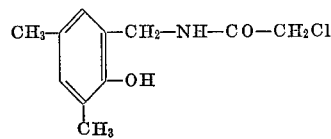

melting at 116–117° C.

*Analysis.*—Calculated (percent): C, 58.0; H, 6.2; N, 6.1. Found (percent): C, 58.1; H, 6.2; N, 6.1.

(B) 18.5 grams of 4-chloro-2-isopropyl-5-methylphenol are dissolved in a mixture of 100 ml. of glacial acetic acid and 30 ml. of pyrophosphoric acid, then 13.6 g. of N-hydroxymethyl-chloracetamide are added portionwise at a temperature not exceeding 20° C. and the whole is stirred until all has dissolved. After the batch has been allowed to stand for 4 days, part of the reaction product has crystallized out and is suctioned off, and the filtrate is stirred into a mixture of 150 ml. of chloroform and 300 ml. of water; the organic phase is separated, once more stirred with fresh water while being rendered weakly alkaline with a 2 N-sodium carbonate solution, dried with sodium sulphate and the solvent is drawn off, to furnish a further reaction product of the Formula B as a crystalline residue. Yield: 22.9 g. (=79% of theory).

(B) 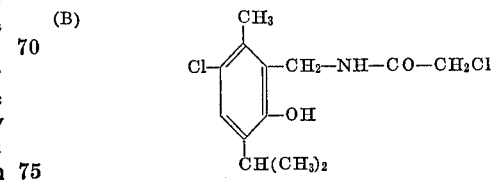

melting point: 129–131° C. after recrystallization from carbon tetrachloride.

*Analysis.*—Calculated (percent): C, 53.8; H, 5.9 N, 4.8. Found (percent): C, 53.7; H, 5.7; N, 4.8.

(C) At a temperature not exceeding 20° C. 81.5 g. of 2,4-dichlorophenol and then 68 g. of N-hydroxymethyl-chloracetamide are dissolved with cooling in ½ litre of sulphuric acid of 96% strength. The whole is kept for 2 hours at room temperature and then poured in a thin jet over 2 kg. of ice. At first a viscid, lumpy material is obtained which, if desired, is comminuted and thoroughly stirred for several hours with 200 ml. of water, during which all crystallizes and breaks up to form a powdery precipitate which is suctioned off and washed with water to remove all acid. After drying, the product is recrystallized from 1.5 litres of carbon tetrachloride, to yield 98 g. (=73% of theory) of the compound of the formula (C)

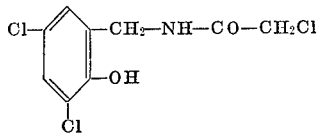

melting at 110–112° C.

*Analysis.*—Calculated (percent): C, 40.3; H, 3.0; Cl, 39.6. Found (percent): C, 40.3; H, 2.8; Cl, 39.2.

(D) 10 grams of 2-chloro-5-trifluoromethyl-phenol are dissolved in 70 ml. of sulphuric acid of 98% strength and then at 10° C. within one hour 6.6 g. of N-hydroxymethyl-chloracetamide are continuously introduced. The batch is stirred on for ½ hour at 10° C. and then poured into a mixture of 300 g. of ice and 400 ml. of methylenechloride. The whole is thoroughly stirred, then suction-filtered and the filter residue is washed with a small quantity of methylenechloride and then with water until it is free from acid, to yield 5.8 g. (=37.6% of theory) of the compound of the formula (d)

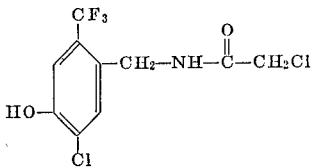

melting at 170 to 172° C. (after recrystallization from chloroform).

*Analysis.*—Calculated (percent): C, 39.8; H, 2.7; N, 4.6. Found (percent): C, 39.9; H, 2.7; N, 4.7.

As revealed by the proton resonance spectrum of compound (d) the two aromatic hydrogen atoms are not vicinal (two signals; at 7.33 and 7.58 p.p.m. respectively).

The methylenechloride phase of the filtrate is separated, dried with sodium sulphate and the solvent evaporated, to leave 6.6 g. (=42.8% of theory) of the compound of the formula (D)

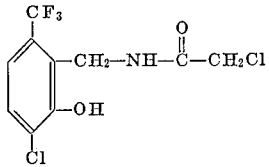

melting at 92 to 94° C. (after recrystallization from a small quantity of carbon tetrachloride).

*Analysis.*—Calculated (percent): C, 39.8; H, 2.7; Cl, 23.5. Found (percent): C, 39.7; H, 2.7; Cl, 23.6.

(E and F) Analogous to the pair of structural isomers of d/D there is obtained from 4-chloro-5-trifluoromethyl-phenol and N-hydroxymethyl-chloracetamide in sulphuric acid of 98% strength the pair of structural isomers E/F which can be separated by fractional crystallization from carbon tetrachloride.

(E)

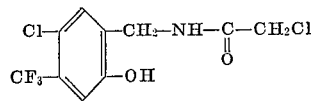

melting at 130 to 132° C. (on recrystallization from carbon tetrachloride).

*Analysis.*—Calculated (percent): C, 39.8; H, 2.7; N, 4.7. Found (percent): C, 39.5; H, 2.9; N, 4.6.

(F)

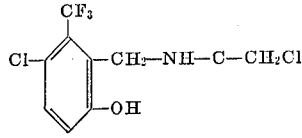

melting at 113–115° C. (from carbon tetrachloride).

*Analysis.*—Calculated (percent): C, 39.8; H, 2.7; N, 4.7. Found (percent): C, 40.1; H, 2.7; N, 4.7.

The determination of the positions in this pair of structural isomers is carried out thus: Both are cyclized with formaldehyde to benzoxazines [(E)→(41) and (F)→(40)] and in these benzoxazines the positions of the aromatic hydrogen atoms are determined by proton resonance. In the benzoxazine (40) formed from (F), the aromatic hydrogen atoms are vicinal: a typical quadruplet is found at 6.92, 7.08, 7.29 and 7.42 p.p.m. The benzoxazine (41), formed from (E), displays in the region of the aromatic hydrogen atoms only 1 signal with shoulder (at 7.25 p.p.m.).

The starting products G to AA listed in Table I are accessible by the manufacturing instructions A to F.

The under-mentioned starting products BB to LL are obtained by modification of the substituents.

(BB) A solution of 15 g. of 2,4-dichloro-6-chloroacetamido-methylphenol (=substance C) in 50 ml. of acetone is added to a solution of 12.6 g. of sodium iodide in 60 ml. of acetone. The whole is kept for 13 hours in a stoppered flask, then the precipitated sodium chloride is filtered off and the solvent is completely expelled from the filtrate under vacuum, the oilys residue is taken up in 100 ml. of benzene and the undissolved excess sodium iodide is filtered off. The filtrate is evaporated to dryness under vacuum and a crystalline residue is obtained constituting 14.6 g. (=81% of theory) of the compound of the formula (BB)

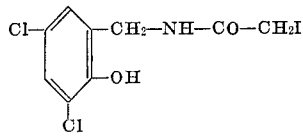

melting at 124° C. after recrystallization from aqueous methanol (1:1).

*Analysis.*—Calculated (percent): C, 30.0; H, 2.2; N, 3.9. Found (percent): C, 29.9; H, 2.3; N, 3.9.

(CC) When 2,4-dimethyl-6-chloroacetamido-methyl-phenol (=substance A) is reacted as described under BB above, it gives a 70% yield of the compound of the formula (CC)

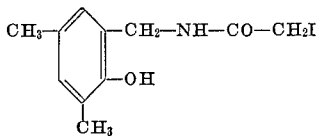

melting at 110 to 111° C. after recrystallization from aqueous methanol (1:1).

*Analysis.*—Calculated (percent): C, 41.4; H, 4.4; I, 39.8. Found (percent): C, 41.0; H, 4.4; I, 39.6.

(DD) 15 grams of 2,4-dimethyl-6-chloroacetamido-methylphenol (=substance A) are dissolved in 40 ml. of morpholine. After a short time the batch heats up considerably and crystals settle out; it is kept overnight, then 100 ml. of 2 N-sodium hydroxide solution are added and the excess morpholine is extracted with ether. The aqueous phase is slowly neutralized with about 70 ml. of 2 N-hydrochloric acid, whereupon the product is obtained as a colourless precipitate weighing 13.7 g. (=74% of theory).

(DD) 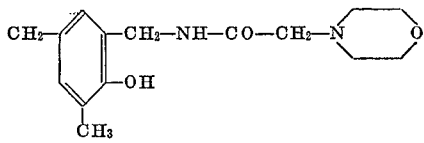

melting at 136 to 138° C. after recrystallization from aqueous alcohol (1:1).

*Analysis.*—Calculated (percent): C, 64.7; H, 8.0; N, 10.1. Found (percent): C, 64.6; H, 7.9; N, 10.0.

(EE) A mixture of 27.9 g. of 2-acrylamidomethyl-4-chlorophenol and a trace of hydroquinone in 200 ml. of glacial acetic acid is dissolved with slight heating, then cooled to room temperature and while cooling with ice water 42.2 g. of bromine are rapidly dropped in. An exothermic reaction sets in immately. The batch is kept for 12 hours at room temperature and the product forms a crystalline precipitate; it is suctioned off and recrystallized from 600 ml. of benzene. Yield: 28 g. (=47% of theory) of the product of the formula (EE) 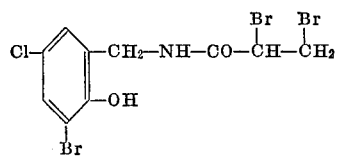

melting at 153–154° C.

*Analysis.*—Calculated (percent): C, 26.7; H, 2.0; N, 3.1; Br, 53.2. Found (percent): C, 26.6; H, 2.0; N, 3.1; Br, 52.5.

(FF) A solution of 26.8 g. of 2,4-dichloro-6-chloroacetamido-methylphenol (=substance C) in 160 ml. of absolute alcohol is added to a solution of 6.9 g. of sodium and 14.8 ml. of ethylmercaptan in 200 ml. of absolute alcohol. The whole is kept for 24 hours at room temperature, whereby sodium chloride is caused to precipitate, then neutralized with 2 N-hydrochloric acid; the precipitated sodium chloride is filtered off and the filtrate concentrated by distillation under atmospheric pressure to 250 ml. Then 800 ml. of water are added, whereupon the product of the Formula FF settles out as a crystalline precipitate. Yield: 27.5 g. (=93% of theory).

(FF) 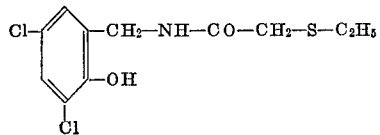

melting at 104 to 105° C. after recrystallization from a minimum of benzene.

*Analysis.*—Calculated (percent): C, 44.9; H, 4.4; Cl, 24.1. Found (percent): C, 44.9; H, 4.4; Cl, 24.0.

(GG) 75 grams of potassium cyanide are dissolved in 1 litre of boiling distilled water; then a suspension of 26.8 g. of 2,4-dichloro-6-chloracetamido-methylphenol (=substance C) in a small quantity of water is added to the boiling solution and the whole is kept for 5 minutes at the boil, then rapidly cooled to room temperature and the precipitate is suctioned off. The filtrate is stirred with cooling into 375 ml. of 4 N-hydrochloric acid. The precipitate formed is suctioned off and washed free from acid, to yield 18.8 g. (=72.6% of theory) of the compound of the formula (GG) 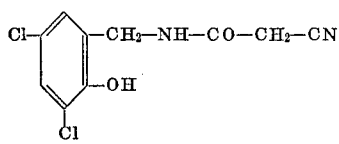

melting at 160° C. (after recrystallization from 300 ml. of xylene).

*Analysis.*—Calculated (percent): C, 46.4; H, 3.1; N, 10.8. Found (percent): C, 46.1; H, 3.2; N, 10.8.

(HH) 10 grams of substance E are dissolved in 55 ml. of glacial acetic acid. At 10° C., within ½ hour, 3.5 g. of chlorine are introduced into this solution and the whole is kept for 4 hours at room temperature; the solvent is completely expelled under vacuum and the initially oily resdue is pasted, to yield 10.9 g. (=98.5% of theory) of the crystalline product (HH) 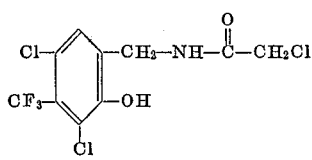

melting at 132 to 133° C. (after recrystallization from carbon tetrachloride).

*Analysis.*—Calculated (percent): C, 35.7; H, 2.1; Cl, 31.6. Found (percent): C, 35.9; H, 2.1; Cl, 31.5.

Products II and JJ are made in the same way as HH.

(KK) 24.6 grams of substances G are dissolved in 300 ml. of glacial acetic acid with slight heating. A trace of hydroquinone is then added and at room temperature a solution of 16 g. of bromine in 20 ml. of glacial acetic acid is added rather rapidly. The whole is kept for 1 hour, then stirred into 2 litres of water, suctioned and washed until free from acid, to give a quantitative yield (40 g.) of the product (KK) 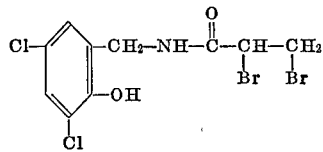

melting at 144 to 146° C. (after recrystallization from benzene).

*Analysis.*—Calculated (percent): C, 29.6; H, 2.2; N, 3.4. Found (percent): C, 29.9; H, 2.3; H, 3.4.

(LL) 10 grams of substance KK are dissolved in a mixture of 49.2 ml. of normal NaOH and 50 ml. of water. After ½ hour the batch is rendered weakly acidic with dilute sulphuric acid and the oily precipitate is taken up in chloroform. The chloroformic solution is dried with sodium sulphate and evaporated under vacuum, to yield as a crystalline residue 7.1 g. (=89% of theory) of (LL) 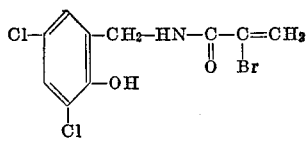

melting at 106 to 107° C. (after recrystallization from benzene).

*Analysis.*—Calculated (percent): C, 37.0; H, 2.5; N, 4.3. Found (percent): C, 37.0; H, 2.6; N, 4.2.

TABLE I

| Product | U₅ | U₆ | U₇ | U₈ | R₂ | Melting point in °C. |
|---|---|---|---|---|---|---|
| A | —H | —CH₃ | —H | —CH₃ | —CH₂Cl | 116–117 |
| B | —CH₃ | —Cl | —H | —i-C₃H₇ | —CH₂Cl | 129–131 |
| C | —H | —Cl | —H | —Cl | —CH₂Cl | 110–112 |
| D | —CF₃ | —H | —H | —Cl | —CH₂Cl | 92–94 |
| E | —H | —Cl | —CF₃ | —H | —CH₂Cl | 130–132 |
| F | —CF₃ | —Cl | —H | —H | —CH₂Cl | 113–115 |
| G | —H | —Cl | —H | —Cl | —CH=CH₂ | 137 |
| H | —H | —Cl | —H | —H | —CH₂Cl | 14g |
| I | —H | —Cl | —H | —CH₃ | —CH₂Cl | 85–86 |
| J | —H | —Cl | —H | —Br | —CH₂Cl | 108–110 |
| K | —H | —Br | —H | —Cl | —CH₂Cl | 113 |
| L | —Cl | —Cl | —H | —Cl | —CH₂Cl | 132 |
| M | —H | —NO₂ | —H | —Cl | —CH₂Cl | 138–139 |
| N | —CH₃ | —Cl | —H | —Cl | —CH₂Cl | 112–114 |
| O | —CH₃ | —Br | —H | —Br | —CH₂Cl | 126–128 |
| P | —CH₃ | —Br | —H | —CH₃ | —CH₂Cl | 145–146 |
| Q | —H | —Cl | —Cl | —H | —CH₂Cl | 151–154 |
| R | —OH | —Cl | —H | —Cl | —CH₂Cl | 189–192 |
| S | —H | —Cl | —H | —Cl | —CH₂F | 118 |
| T | —H | —Cl | —H | —Cl | —CH₂Br | 108–110 |
| U | —H | —CH₃ | —H | —CH₃ | —C₆H₅ | 112–114 |
| V | —H | —Cl | —H | —Cl | —C₆H₄—Cl | 198 |
| W | —H | —Cl | —H | —Cl | —C₆H₄—NO₂ | 183–187 |
| X | —H | —N=N—C₆H₄—Cl | —H | —Cl | —CH₂Cl | 150–151 |
| Y | —H | —C₆H₄—Cl | —H | —Cl | —CH₂Cl | 151–152 |
| Z | —H | —C(CH₃)₃ | —H | —CH₃ | —CH₂—Cl | 113–114 |
| AA | —H | —Cl | —H | —F | —CH₂Cl | 121–122 |
| BB | —H | —Cl | —H | —Cl | —CH₂I | 124 |
| CC | —H | —CH₃ | —H | —CH₃ | —CH₂I | 110–111 |
| DD | —H | —CH₃ | —H | —CH₃ | —CH₂—N(morpholino) | 136–138 |
| EE | —H | —Cl | —H | —Br | —CHBr—CH₂Br | 153–154 |
| FF | —H | —Cl | —H | —Cl | —CH₂—S—C₂H₅ | 104–105 |
| GG | —H | —Cl | —H | —Cl | —CH₂CN | 160 |
| HH | —H | —Cl | —CF₃ | —Cl | —CH₂Cl | 132–133 |
| II | —CH₃ | —Cl | —CH₃ | —Cl | —CH₂Cl | 167–169 |
| JJ | —NO₂ | —Cl | —H | —Cl | —CH₂Cl | 161–162 |
| KK | —H | —Cl | —H | —Cl | —CH—CH₂ with Br Br | 144–146 |
| LL | —H | —Cl | —H | —Cl | —C(Br)=CH₂ | 106–107 |

EXAMPLE 1

A mixture of 45 g. of 2,4-dimethyl-6-acryloylamidomethylphenol, 13.2 g. of paraformaldehyde, 0.9 g. of para-toluenesulphonic acid and a small pinch of thiophenazine with 300 ml. of anhydrous benzene is heated for 15 minutes at 70° C. while being thoroughly stirred, whereupon all passes into solution. Then 125 ml. of benzene are distilled off, and 4.2 ml. of water (theory: 3.9 ml.) separate in the distillate. The reaction mixture is cooled to room temperature and the benzolic solution is agitated with 200 ml. of N-sodium hydroxide solution and then with 2× 100 ml. of water to remove any unreacted phenol derivative. The benzolic phase is dried with sodium sulphate and then evaporated under vacuum, to yield as residue 44.0 g. (= 92% of theory) of the compound of the formula (1) 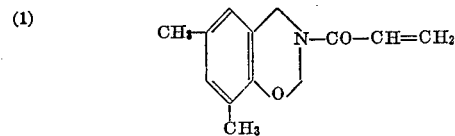

melting at 64 an 65° C. (after recrystallization from benzene).

*Analysis.*—Calculated (percent): C, 71.9; H, 7.0; N, 6.5. Found (percent): C, 71.9; H, 7.1; N, 6.6.

EXAMPLE 2

A mixture of 5.8 g. of 5-chloro-7-acryloylamidomethyl-8-hydroxyquinoline, 2.5 g. of para-toluenesulphonic acid, 2.5 g. of paraformaldehyde and a trace of thiophenazine together with 110 ml. of anhydrous xylene is heated for 15 minutes at 100° C. Then 10 ml. of xylene are distilled off, during which 0.4 ml. of water separate in the distillate. The reaction mixture is cooled to room temperature and the precipitate formed is suctioned off, dried, finely pulverized, then stirred for some time with 160 of 0.5 N-sodium hydroxide solution, suctioned, stirred for some time at 35° C. with 100 ml. of water, suctioned off and washed free from alkali, to yield 2.9 g. (=48% of theory) of the product of the formula (2) 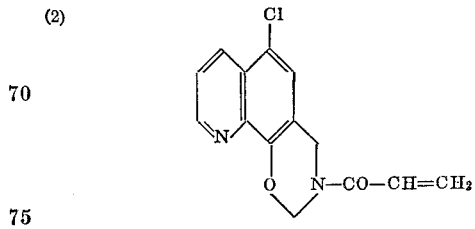

melting at 216 to 217° C. (after recrystallization from xylene).

*Analysis.*—Calculated (percent): 61.2; H, 4.0; Cl, 12.9. Found (percent): C, 61.1; H, 4.0; Cl, 13.0.

The oxazine is also accessible by reacting 5-chloro-7-acryloylamidomethyl-8-hydroxyquinoline with paraformaldehyde in concentrated sulphuric acid as solvent.

EXAMPLE 3

A mixture of 60 g. of starting product (C), 13 g. of paraformaldehyde, 1.8 g. of para-toluenesulphonic acid and 500 ml. of anhydrous benzene is heated for 20 minutes at 70° C. Then 150 ml. of benzene are distilled off, with 4.4 ml. of water (theory: 4.0 ml.) separating in the distillate. The reaction mixture is cooled to room temperature and agitated first with 200 ml. of 2 N-sodium hydroxide solution and then with 2× 200 ml. of water. The benzolic phase is treated with sodium sulphate and animal charcoal, filtered, and the filtrate is completely evaporated in vacuo, to yield as crystalline residue 35 g. (=56% of theory) of the compound of the formula (3)
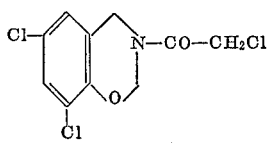

melting at 111 to 112° C. (after recrystallization from carbon tetrachloride).

*Analysis.*—Calculated (Percent): C, 42.8; H, 2.9; N, 5.0. Found (percent): C, 42.8; H, 3.0; N, 5.1.

EXAMPLE 4

A solution of 6 g. of substance HH in 35 ml. of sulphuric acid of 98% strength is mixed at 15° C. with 1.2 g. of paraformaldehyde which dissolves quickly. The whole is kept in a stoppered flask for 15 hours and then poured out over 160 g. of ice. The lumpy precipitate is taken up in 80 ml. of chloroform, and the chloroform solution is agitated first with 60 ml. of N-sodium hydroxide solution and then with 100 ml. of water and then dried with sodium sulphate. The solvent is expelled under vacuum, and the thickly oily residue crystallizes right through after several hours' evacuation, to yield 4.6 g. (=84% of theory) of the product (4)
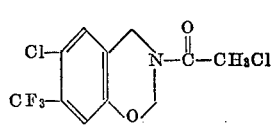

melting at 78 to 79° C. (on recrystallization from carbon tetrachloride).

*Analysis.*—Calculated (percent): C, 37.9; H, 2.0; N, 4.0 Found (percent): C, 37.6; H, 2.0; N, 3.8.

The compound is also accessible by reacting HH with paraformaldehyde in benzene or toluene in the presence of para-toluenesulphonic acid, though this route furnishes a less pure product.

According to the method described in principle in Examples 1 to 4, using as reaction medium benzene, toluene, chlorobenzene, xylene or benzene+dioxane mixtures there are obtained the N-acyl-dihydrobenzoxazines-(1,3) listed in Table II under Nos. 5 to 44 from the phenols A to LL. By modifying the substituents in oxazines of the Formulae 1 to 44 the oxazines Nos. 45 to 56 are obtained.

EXAMPLE 45

A solution of 15 g. of starting substance (EE) in 200 ml. of boiling anhydrous benzene is cooled to 60° C. and 0.4 g. of para-toluenesulphonic acid and 2.7 g. of paraformaldehyde are added. The batch is then heated for 20 minutes at 70° C. and then 150 ml. of benzene are distilled off. The whole is kept in a stoppered flask for 2 days at room temperature, during which some of the unreacted starting material settles out; it is filtered off, the filtrate is mixed with 5 ml. of triethyl amine and refluxed for 30 minutes. After cooling, the precipitated triethylamine hydrobromide is filtered off, the filtrate washed with N-hydrochloric acid, then with 0.5 N-sodium hydroxide solution and finally with water, and the solvent is expelled under vacuum, to yield 4 g. of the product of the formula

(45)
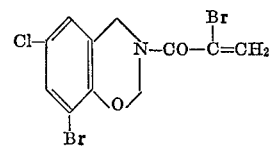

melting at 113 to 115° C. (after recrystallization from cyclohexane).

*Analysis.*—Calculated (percent): C, 34.6; H, 2.1; N, 3.7. Found (percent): C, 35.0; H, 2.1; N, 3.6.

EXAMPLE 46

23 grams of the oxazine (1) are dissolved in 100 ml. of carbon tetrachloride, and a solution of 5.78 ml. of bromine in 20 ml. of carbon tetrachloride is dropped in while cooling with water. Finally, the batch is stirred for 15 minutes and the solvent is expelled under vacuum. The thick, oily residue is rubbed with 150 ml. of petroleum ether, whereupon it crystallizes right through, to yield 37 g. (=92% of theory) of the compound of the formula

(46)
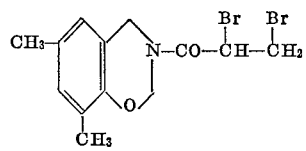

melting at 103 to 104° C. (after recrystallization from cyclohexane+benzene 4:1).

*Analysis.*—Calculated (percent): C, 41.4; H, 4.0; N, 3.7. Found (percent): C, 41.1; H, 4.0; N, 3.6.

EXAMPLE 47

A solution of 4.4 g. of the oxazine (33) in 170 ml. of ether is mixed with 2 ml. of peracetic acid of 60% strength, stirred for 2 hours, and agitated with 100 ml. of water; the crystals settling out copiously are filtered off and yield 3.5 g. (=75% of theory) of the compound of the formula

(47)
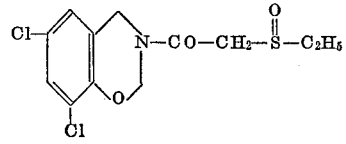

melting at 131–132° C. (after recrystallization from alcohol+water 1:3).

*Analysis.*—Calculated (percent): C, 44.7; H, 4.1; Cl, 22.0. Found (percent): C, 44.8; H, 4.2; Cl, 21.9.

EXAMPLE 48

A mixture of 4.1 g. of the oxazine (16) and 15 ml. of pyridine is slowly heated to 115° C. At first, everything passes into solution and then exothermic crystallization sets in spontaneously. The batch is cooled, the precipitate suctioned off and thoroughly washed with ether, to yield 4.9 g. (=95% of theory) of the product of the formula

(48) 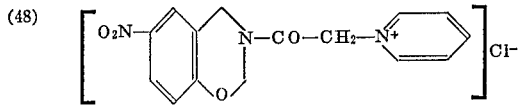

which decomposes at 206° C.

*Analysis.*—Calculated (percent): C, 53.7; H, 4.2; N, 12.5. Found (percent): C, 53.5; H, 4.6; N, 11.8.

The product probably contains a small quantity of water of crystallization.

EXAMPLE 49

The reaction described in Example 48 of the oxazine (3) and pyridine furnishes the substance of the formula

(49) 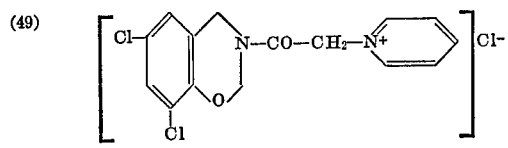

in a yield of 88%. It decomposes at 226° C.

EXAMPLE 50

A mixture of 8 g. of the oxazine (3) and 1.9 g. of phosphorous pentasulphide, both finely powdered, and 100 ml. of anhydrous xylene is refluxed for 4 hours under nitrogen with exclusion of moisture, and while being vigorously stirred. The reaction mixture is filtered and the filtrate evaporated under vacuum.

The semi-crystalline residue is chromatographed on neutral alumina in a benzolic solution, and the desired product is eluted with benzene as a yellow zone, whereas dark-coloured impurities remain on the column. Yield: 4.85 g. (=57% of theory) of the substance of the formula

(50) 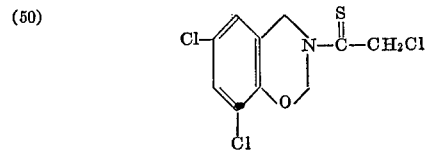

melting at 117–118° C. (after recrystallization from carbon tetrachloride).

*Analysis.*—Calculated (percent): C, 40.5; H, 2.7; S, 10.8. Found (percent): C, 40.6; H, 2.8; S, 11.1.

EXAMPLE 51

8 grams of the oxazine (5) are dissolved with heating in 400 ml. of carbon tetrachloride and then cooled to room temperature again. In the course of 1 hour a solution of 4.95 g. of bromine in 15 ml. of carbon tetrachloride is dropped in and the whole is kept for 1 hour, then evaporated under vacuum and kept a few hours longer under vacuum, to yield 13 g. (=100%) of the product of the formula

(51) 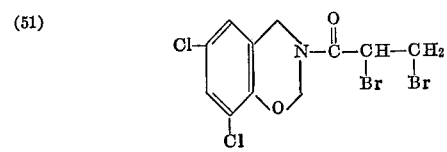

as a tough, hard substance.

EXAMPLE 52

A solution of the oxazine (51) in 60 ml. of methanol is mixed with 10 g. of sodium bicarbonate, stirred for 1 hour at 60° C. and then filtered while still hot. On cooling, 5 g. (=48% of theory) of the product of the formula

(52) 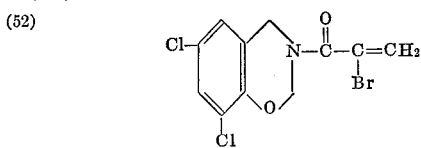

crystallize out; it melts at 99–101° C. (on recrystallization from carbon tetrachloride).

*Analysis.*—Calculated (percent): C, 39.2; H, 2.4; N, 4.2. Found (percent): C, 39.4; H, 2.5; N, 4.3.

This substance is also accessible by cyclization of (LL) with paraformaldehyde in benzene or of (KK) followed by dehydrobromination by means of sodium bicarbonate. However, these processes give poorer yields.

EXAMPLES 53 AND 54

When the oxazine (5) is reacted with Cl₂ as in Examples 51 and 52 (in glacial acetic acid as solvent) and the resulting crude product (53) is treated with sodium bicarbonate in hot methanol, the compound of the formula

(54) 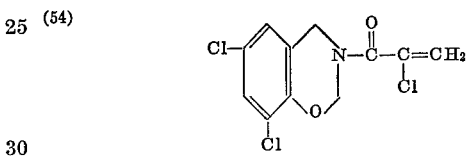

is obtained which is analogous to (52) and melts at 107–108° C. (after recrystallization from carbon tetrachloride).

*Analysis.*—Calculated (percent): C, 45.2; H, 2.8; Cl, 36.4. Found (percent): C, 45.4; H, 2.9; Cl, 36.4.

EXAMPLE 55

A solution of 6.6 g. of sodium thiocyanate in 150 ml. of ethanol is mixed with 5.6 g. of the oxazine (31) and refluxed for ½ hour, during which sodium chloride settles out and is filtered off. The solvent is expelled under vacuum and the residue washed with water and dried, to yield 5.7 g. (=94% of theory) of the compound

(55) 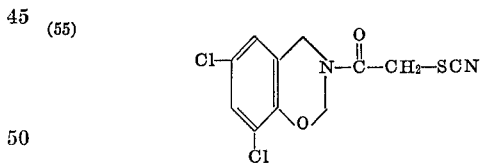

melting at 111–113° C. (after recrystallization from methanol).

*Analysis.*—Calculated (percent): C, 43.6; H, 2.7; N, 9.2. Found (percent): C, 43.7; H, 2.6; N, 9.1.

The infrared spectrum contains a sharp band at 4.61μ which must be accorded to the thiocyanate structure (pure isothiocyanate).

When the oxazine (15) is reacted with sodium thiocyanate as described in Example 55, the compound

(56) 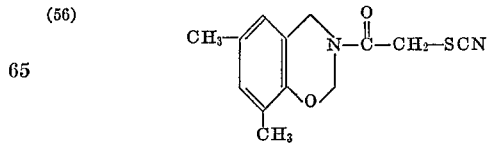

is obtained which melts at 87–89° C. (after recrystallization from carbon tetrachloride).

*Analysis.*—Calculated (percent): C, 59.5; H, 5.4; N, 10.7. Found (percent): C, 59.6; H, 5.2; N, 10.5.

In the IR spectrum sharp band at 5.62μ (thiocyanate structure).

TABLE II

| Ex. No. | U₅ | U₆ | U₇ | U₈ | R₂ | M.P. °C. | Starting product |
|---|---|---|---|---|---|---|---|
| 1 | —H | —CH₃ | —H | —CH₃ | —CH=CH₂ | 64–65 | (¹) |
| 2 | —H | —Cl | (²) | (²) | —CH=CH₂ | 216–217 | (³) |
| 3 | —H | —Cl | —H | —Cl | —CH₂Cl | 111–112 | C |
| 4 | —H | —Cl | —CF₃ | —Cl | —CH₂Cl | 78–79 | HH |
| 5 | —H | —Cl | —H | —Cl | —CH=CH₂ | 125 | G |
| 6 | —H | —Cl | —H | —H | —CH=CH₂ | 94 | (¹) |
| 7 | —H | —Cl | —H | —CH₃ | —CH=CH₂ | 84 | (¹) |
| 8 | —CH₃ | —Cl | —H | i-C₃H₇ | —CH=CH₂ | 75–77 | (¹) |
| 9 | —H | —Cl | —H | —NO₂ | —CH=CH₂ | 186 | (¹) |
| 10 | —H | —NO₂ | —H | —H | —CH=CH₂ | 165–167 | (¹) |
| 11 | —H | —NO₂ | —H | —H | 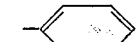 | 123 | (⁴) |
| 12 | —H | —CH₃ | —H | —CH₃ | 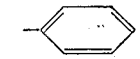 | 62–64 | U |
| 13 | —H | —Cl | —H | —Cl | 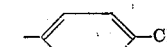 | 118 | V |
| 14 | —H | —Cl | —H | —Cl |  | 146–150 | W |
| 15 | —H | —CH₃ | —H | —CH₃ | —CH₂Cl | 91 | A |
| 16 | —H | —NO₂ | —H | —H | —CH₂Cl | 130 | (⁵) |
| 17 | —H | —NO₂ | —H | —Cl | —CH₂Cl | 154 | M |
| 18 | —H | —Cl | —H | —H | —CH₂Cl | 106–108 | H |
| 19 | —H | —Cl | —H | —CH₃ | —CH₂Cl | 82–84 | I |
| 20 | —CH₃ | —Cl | —H | —i-C₃H₇ | —CH₂Cl | 129–130 | B |
| 21 | —H | —Cl | —H | —Br | —CH₂Cl | 144 | J |
| 22 | —H | —Br | —H | —Cl | —CH₂Cl | 115 | K |
| 23 | —CH₃ | —Br | —H | —CH₃ | —CH₂Cl | 175–176 | P |
| 24 | —CH₃ | —Br | —H | —Br | —CH₂Cl | 164–166 | O |
| 25 | —CH₃ | —Cl | —H | —Cl | —CH₂Cl | 139–140 | N |
| 26 | —Cl | —Cl | —H | —Cl | —CH₂Cl | 120 | L |
| 27 | —H | —Cl | —Cl | —H | —CH₂Cl | 125–126 | Q |
| 28 | —H | —Cl | —H | —Cl | —CH₂Br | 108–110 | T |
| 29 | —H | —CH₃ | —H | —CH₃ | —CH₂I | 74 | CC |
| 30 | —H | —Cl | —H | —Cl | —CH₂I | 101–104 | BB |
| 31 | —H | —Cl | —H | —Cl | —CH₂F | 93 | S |
| 32 | —H | —CH₃ | —H | —CH₃ | 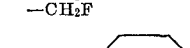 | 86 | DD |
| 33 | —H | —Cl | —H | —Cl | —CH₂—S—C₂H₅ | 91–93 | FF |
| 34 | —H | —Cl | —H | —Cl | —CH₂CN | 158–160 | GG |
| 35 | —H |  | —H | —Cl | —CH₂Cl | 191–192 | X |
| 36 | —H | 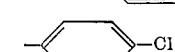 | —H | —Cl | —CH₂Cl | 195–197 | Y |
| 37 | —OH | —Cl | —H | —Cl | —CH₂Cl | 161–163 | R |
| 38 | —H | —Cl | —H | —F | —CH₂Cl | 106–108 | AA |
| 39 | —CF₃ | —H | —H | —Cl | —CH₂Cl | 113–115 | D |
| 40 | —CF₃ | —Cl | —H | —H | —CH₂Cl | 100–101.5 | F |
| 41 | —H | —Cl | —CF₃ | —H | —CH₂Cl | 81–83 | E |
| 42 | —H | —C(CH₃)₃ | —H | —CH₃ | —CH₂Cl | 120–121 | Z |
| 43 | —CH₃ | —Cl | —CH₃ | —Cl | —CH₂Cl | 145–146 | II |
| 44 | —NO₂ | —Cl | —H | —Cl | —CH₂Cl | 105–106 | JJ |
| 45 | —H | —Cl | —H | —Br | —CBr=CH₂ | 113–115 | EE |
| 46 | —H | —CH₃ | —H | —CH₃ | —CHBr—CH₂Br | 103–104 | No. 1. |
| 47 | —H | —Cl | —H | —Cl | —CH₂—S(=O)—C₂H₅ | 131–132 | No. 33. |
| 48 | —H | —NO₂ | —H | —H | 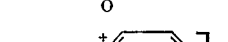 | 206 | No. 16. |
| 49 | —H | —Cl | —H | —Cl | 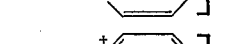 | 226 | No. 3. |
| 50 | —H | —Cl | —H | —Cl | —CH₂Cl (⁶) | 117–118 | No. 3. |
| 51 | —H | —Cl | —H | —Cl | —CHBr—CH₂Br | ---------- | No. 5 or KK. |
| 52 | —H | —Cl | —H | —Cl | —CBr=CH₂ | 99–101 | No. 51 or LL. |
| 53 | —H | —Cl | —H | —Cl | —CHCl—CH₂Cl | ---------- | No. 5. |
| 54 | —H | —Cl | —H | —Cl | —CC=CH₂ | 107–108 | No. 53. |
| 55 | —H | —Cl | —H | —Cl | —CH₂—SCN | 111–113 | No. 3. |
| 56 | —H | —CH₃ | —H | —CH₃ | —CH₂—SCN | 87–89 | No. 15. |

¹ According to Swiss Patent Application 4,510/65 (Case 5,668).
² Residues U₇ and U₈ together with the benzene ring form a quinoline skeleton; cf. Formulae (II) and (2).
³ According to Swiss Patent Application 17,733/65 (Case 5,835).
⁴ According to H. Hellmann, Angew. Chem. 69, 471 [1957[.
⁵ According to Einhorn, Ann. 343, page 207 [1905].
⁶ Thioacyl instead of acyl residue; cf. Formula (41).

EXAMPLE 57

While stirring and introducing nitrogen into it at 65° C. a solution of 4 parts of the compound of the Formula 1, 5.5 parts of methacrylic acid dimethylaminomethyl amide and 0.5 part of methacrylamide-N-methylolmethyl ether in 35 parts of dimethylformamide is mixed with a solution of 0.08 part of azodiisobutyronitrile in 2 parts of dimethylformamide. After 30 minutes a solution of 0.08 part of azodiisobutyronitrile in 2 parts of dimethylformamide is added. The batch is further polymerized for 12 hours and on evaporating the solution under vacuum there are obtained about 9 parts of a faintly yellowish, film-forming copolymer which is soluble in water on addition of an acid.

EXAMPLE 58

When 4 parts of the compound of the Formula 1, 5.5 parts of 4-vinylpyridine and 0.5 part of methacrylamide-N-methylolmethyl ether are polymerized as described in Example 57 there is obtained in the same manner a copolymer that can be dissolved in water on addition of an acid.

EXAMPLE 59

When 4 parts of the compound of the Formula 5, 5.5 parts of methacrylic acid-dimethylaminomethylamide and 0.5 part of methacrylamide-N-methylolmethyl ether are polymerized as described in Example 57, there is obtained in the same manner a copolymer that becomes soluble in water on addition of an acid.

EXAMPLE 60

20 parts of acrylic acid-n-butyl ester, 25 parts of the compound of the Formula 1, 2.5 parts of acrylonitrile and 2.5 parts of methacrylamide-N-methylolmethyl ether are pre-emulsified in a solution of 1.25 parts of sodium lauroylsulphonate and 0.5 part of disodium phosphate in 86 parts of water. The whole is heated to 75° C. in order to melt the compound of the Formula 1 and to disperse it finely, and this pre-emulsion is then cooled. One half of this pre-emulsion is stirred and heated to 75° C. and nitrogen is introduced into it, and a solution of 0.125 part of potassium persulphate in 2.5 parts of water and a solution of 0.05 part of sodium metabisulphite in 2.5 parts of water are added. The remainder of the pre-emulsion is then mixed with a solution of 0.125 part of potassium persulphate in 2.5 parts of water and in the course of 60 minutes run into the polymerization vessel. 30 minutes after completion of this running-in a solution of 0.05 part of sodium metabisulphite in 2.5 parts of water is added and the batch is allowed to polymerize for another 3 hours at 75° C. There are obtained about 142 parts of an emulsion having a dry content of 35%, corresponding to a polymer yield of 96%.

EXAMPLE 61

Determining the minimal inhibitory concentration towards bacteria and fungi in the dilution test The MIC (minimal inhibitory concentration) is tested by a method adapted from standard specifications which affords an approximation of an active substance to absolute minimal inhibitory values.

A solution of 1% and one of 0.3% strength of the active substance to be tested in dimethylsulphoxide are introduced into little tubes with sterile brain heart infusion broth (bacteria) and beer wort solution (fungi) and with these solutions dilution series are prepared in which each member is one tenth of the preceding member. By combining the two series the following continuous dilution series is obtained: 1000–300–100–30–10–3 parts per million etc.

The solutions are inoculated with the bacterium Staphylococcus aureus and the fungi Aspergillus niger and Rhizopus nigricans. The bacterial solutions are then incubated for 48 hours at 37° C. (bacteriostatic test) and the fungus solutions for 72 hours at 30° C. (fungistatic test).

After these periods the minimal inhibitory concentrations (in parts per million) shown in the following Table III are found:

TABLE III

| Compound of Example No. | Aspergillus niger | Rhizopus nigricans | Staphylococcus aureus Static effect | Staphylococcus aureus Cidal effect |
|---|---|---|---|---|
| 1 | 100 | 30 | | |
| 3 | 30 | 10 | 10 | 10 |
| 5 | 100 | 30 | | |
| 7 | 100 | 30 | | |
| 10 | 100 | 30 | | |
| 15 | 30 | 30 | 100 | 100 |
| 16 | 30 | 30 | | |
| 17 | 30 | 30 | 100 | 100 |
| 18 | 10 | 10 | 100 | 100 |
| 19 | 30 | 10 | 100 | 100 |
| 21 | 30 | 30 | 100 | |
| 22 | 30 | 10 | 30 | 30 |
| 24 | | | 10 | |
| 25 | 100 | 100 | 10 | 30 |
| 26 | 30 | 10 | 10 | 10 |
| 27 | 30 | 10 | 100 | 100 |
| 28 | 100 | 30 | 3 | 10 |
| 30 | 100 | 30 | 10 | 10 |
| 38 | 30 | 30 | 100 | 100 |
| 39 | 30 | 30 | 100 | 100 |
| 40 | 30 | 30 | 10 | 30 |
| 41 | 30 | 30 | 10 | 30 |
| 44 | 100 | 30 | 30 | 30 |
| 45 | 30 | 30 | | |
| 50 | 100 | 30 | | 100 |
| 52 | 30 | 30 | | |
| 55 | 100 | 30 | 100 | |
| 57 (polymer) | 100 | 30 | | 100 |
| 59 (polymer) | 100 | 30 | | |

Effect against Escherichia coli 100 parts per million.

EXAMPLE 62

Determining the minimal inhibitory concentration (MIC) against bacteria and fungi in the gradient plate test:

$x$ p.p.m. of the preparation, in a suitable formulation, are added to the still liquid brain heart infusion agar (BHIA); this liquid mixture is poured over a basal agar nutrient layer (BHIA) without the preparation, which had first been slanted for solidification, and allowed to solidify.

For inoculation the germs to be tested are applied by means of a Pasteur pipette in lines at right angles to the gradient.

After 24 hours' incubation at 37° C. the length of the germs grown on the inoculation stroke is measured and expressed in p.p.m. of the preparation.

TABLE IV

| Fungus | p.p.m. of preparation of compound No.— 3 | p.p.m. of preparation of compound No.— 29 |
|---|---|---|
| Candida albicans | 35 | 8 |
| Rhodotorula rubra | 4 | 5 |
| Aspergillus elegans | 25 | 35 |
| Trichophyton interdigitale | 1.5 | 1 |
| Trichophyton mentagrophytes | 2 | 1 |
| Paecilomyces varioti | 0.3 | 2.5 |

EXAMPLE 63

Antimicrobial dressing of cotton (a) Cotton cretonne is padded with solutions of the oxazines Nos. 3 and 29 in toluene, expressed to a weight increase of 80 to 100%, and then dried in a drying cabinet at 30 to 40° C. The toluolic solutions are prepared so that 1% of the antimicrobial substance, referred to the fabric weight, is deposited on the fabric. The oxazines do not colour the cotton.

(b) Determining the antimicrobial effect of dressed cotton fabrics in the agar diffusion test.—To test the antibacterial effect roundels of 10 mm. diameter of the impregnated fabric are placed on brain heart infusion agar plates which had previously been inoculated with Staphylococcus aureous or with Escherichia coli. The plates are then incubated for 24 hours at 37° C.

To test the anti-fungus effect roundels of 25 mm. diameter are placed on beerwort agar plates, then inoculated with Aspergillus niger, and the plates are incubated for 72 hours at 30° C.

The evaluation of the test results extends to the inhibitory zone (IZ in mm.) encircling the roundels on the one hand and, on the other hand, to the growth discernible microscopically (G in percent) under and/or on the fabric.

TABLE V

| Compound No. (watered, as is)[1] | Staphylococcus aureus | | Escherichi coli | | Aspergillus niger | |
|---|---|---|---|---|---|---|
| | IZ (mm.) | G (percent) | IZ (mm.) | G (percent) | IZ (mm.) | G (percent) |
| 29 | 13 | 0 | 3 | 0 | 15 | 0 |
| | 8 | 0 | 0 | 100 | 0 | 100 |
| 3 | 5 | 0 | 0 | 100 | 5 | 0 |
| | 3 | 0 | 0 | 100 | 1 | 0 |

[1] EMPA-watering: 24 hours at 30° C.

EXAMPLE 64

Antimicrobial additives to soft polyvinylchloride

Compound No. 3 does not colour PVC even on heating to 200° C.

(a) Rough soft-PVC sheets 1 mm. thick are manufactured at 150° C. on the roll mill; the sheets contain 2% of the antimicrobial substance.

(b) Determining the antimicrobial effect of dressed synthetics in the agar diffusion test.—To test the antibacterial effect roundels of 10 mm. diameter are blanked out of soft-PVC and placed on brain heart infusion agar plates previously inoculated with *Staphylococcus aureus* or with *Escherichia coli*, and the plates are then incubated for 24 hours at 37° C.

To test the fungitoxic properties roundels of 25 mm. diameter are placed on plates consisting of complete mineral salt agar and then inoculated with a spore mixture from 5 test fungi (*Aspergillus niger, Paecilomyces varioti, Penicillium funiculosum, Trichoderma viride* and *Chaetomium globosum*), and the plates are incubated for 28 days at 30° C.

The testing extends, on one hand, to the inhibitory zone (IZ in mm.) encircling the roundels and, on the other hand, to the microscopically discernible growth (G in percent) under and/or on the synthetic material.

above, and $R_3$ represents a member selected from the group consisting of morpholinomethyl, cyanomethyl, thiocyanomethyl, ethylmercaptomethyl, halogenomethyl, vinyl, a-halogenvinyl, phenyl, p-chlorophenyl and p-nitrophenyl.

2. An N-acyl - 3,4 - dihydro-2-H-1,3-benzo-xazine as claimed in claim 1 of the formula

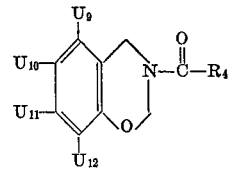

in which one U represents a hydrogen atom, at least one U represents a member selected from the group consisting of fluorine, chlorine, bromine, methyl and nitro and the other U's stand each for a member selected from the group consisting of a hydrogen atom and one of the substituents mentioned above, and $R_4$ represents a member selected from the group consisting of halogenomethyl, vinyl and a-halogenovinyl.

3. The compound of the formula

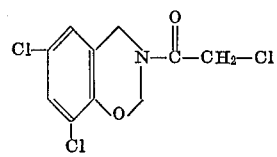

| Compound No. (watered as is)[1] | Staphylococcus aureus | | Escheria coli | | Fungus mixture | |
|---|---|---|---|---|---|---|
| | IZ (mm.) | G (percent) | IZ (mm.) | G (percent) | IZ (mm.) | G (percent) |
| 3 | 4 | 0 | 0 | 100 | 0 | 0 |
| | 4 | 0 | 0 | 100 | | |

[1] EMPA-watering: 24 hours at 30° C.

We claim:
1. An N-acyl-3,4-dihydro-2H-1,3-benzoxazine of the formula

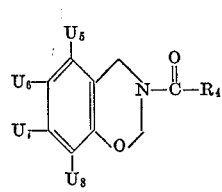

in which at least one U represents a member selected from the group consisting of halogen, lower alkyl of 1-4 carbon atoms, trifluoromethyl, nitro, phenyl, p-chlorophenyl, phenyldiazo and p-chlorophenyldiazo, and the other U's represent each a member selected from the group consisting of hydrogen and one of the substituents mentioned 4. The compound of the formula

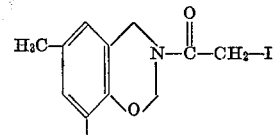

5. The compound of the formula

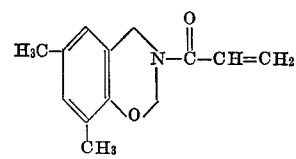

6. The compound of the formula
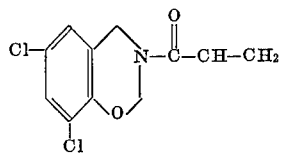
References Cited
FOREIGN PATENTS
694,489  7/1953  Great Britain.
OTHER REFERENCES
Kuehne et al.: Jour. Med. Pharm. Chem. vol. 5, pp. 257–65 relied on.
HENRY R. JILES, Primary Examiner
N. TROUSOF, Assistant Examiner
U.S. Cl. X.R.
260—66, 80, 80.72, 85.5, 85.7, 87.5, 88.1, 152, 207.1, 247.2, 287, 465, 558, 562; 424—226, 248

CASE 5971/E

PO-1050 (5/69)

UNITED STATES PATENT OFFICE
CERTIFICATE OF CORRECTION

Patent No. 3,519,624      Dated July 7, 1970

Inventor(s) HELMUT HUBER-EMDEN ET AL

It is certified that error appears in the above-identified patent and that said Letters Patent are hereby corrected as shown below:

Column 21, lines 60-65, the right hand side of the formula should read

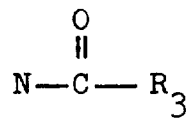

$$N-\overset{\overset{O}{\|}}{C}-R_3$$

Signed and sealed this 13th day of July 1971.

(SEAL)
Attest:

EDWARD M. FLETCHER, JR.
Attesting Officer

WILLIAM E. SCHUYLER, JR.
Commissioner of Patents